(12) United States Patent
Singh (10) Patent No.: US 11,450,115 B1
(45) Date of Patent: Sep. 20, 2022

(54) OFFICE SAFETY CONTROL SYSTEM

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/220,631

(22) Filed: Apr. 1, 2021

(51) Int. Cl.
| | |
|---|---|
| *G06V 20/52* | (2022.01) |
| *G06V 40/20* | (2022.01) |
| *G06V 40/10* | (2022.01) |
| *G06T 7/70* | (2017.01) |
| *G06Q 10/06* | (2012.01) |
| *G06Q 10/10* | (2012.01) |

(52) U.S. Cl.
CPC ....... *G06V 20/53* (2022.01); *G06Q 10/06313* (2013.01); *G06Q 10/1097* (2013.01); *G06T 7/70* (2017.01); *G06V 40/103* (2022.01); *G06V 40/23* (2022.01); *G06T 2207/10016* (2013.01); *G06T 2207/30196* (2013.01); *G06T 2207/30232* (2013.01); *G06T 2207/30242* (2013.01)

(58) Field of Classification Search
CPC ......... G06V 20/53; G06V 40/103; G06T 7/70
USPC ........................................................ 348/143
See application file for complete search history.

(56) References Cited

U.S. PATENT DOCUMENTS

| | | | | |
|---|---|---|---|---|
| 10,733,457 | B1* | 8/2020 | Agnihotram | ..... G08B 13/19602 |
| 2008/0300951 | A1* | 12/2008 | Kelly | ............... G06Q 10/06311 |
| | | | | 705/7.13 |
| 2013/0034266 | A1* | 2/2013 | Shamir | ................... G06T 7/246 |
| | | | | 382/103 |
| 2021/0120369 | A1* | 4/2021 | Pinho | ............. G06Q 10/063114 |
| 2021/0150380 | A1* | 5/2021 | Verteletskyi | ........... G06V 20/53 |

* cited by examiner

*Primary Examiner* — Amir Shahnami
(74) *Attorney, Agent, or Firm* — Finch & Maloney PLLC (57) ABSTRACT

A computer system is provided. The computer system includes a memory and at least one processor coupled to the memory and configured to provide office safety controls. The at least one processor is further configured to perform computer vision analysis on an image of a shared resource to determine safety related conditions associated with the shared resource, the safety related conditions including a count of people using the shared resource and timing of the use of the shared resource, and update analytics associated with the shared resource based on the determined safety related conditions. The at least one processor is further configured to maintain a notification subscription associated with a user, the notification subscription including user specified safety parameters related to the shared resource, and generate a notification regarding the shared resource, the generation based on a comparison of the updated analytics and the user specified safety parameters.

24 Claims, 6 Drawing Sheets

OFFICE SAFETY CONTROL SYSTEM

BACKGROUND

Providing a safe workplace that reduces the risk of employee infection is an issue of great concern as workers return to office environments after an extended period of work-from-home that has been imposed by the pandemic.

SUMMARY

In at least one example, a computer system is provided. The computer system includes a memory; and at least one processor coupled to the memory and configured to: perform computer vision analysis on an image of a shared resource to determine safety related conditions associated with the shared resource, the safety related conditions including a count of people using the shared resource and timing of the use of the shared resource; update analytics associated with the shared resource based on the determined safety related conditions; maintain a notification subscription associated with a user, the notification subscription including user specified safety parameters related to the shared resource; and generate a notification regarding the shared resource, the generation being based on a comparison of the updated analytics and the user specified safety parameters.

At least some examples of the computer system can include one or more of the following features. The analytics include one or more of a count of people entering a location associated with the shared resource, a count of people exiting the location associated with the shared resource, a classification of activity of people using the shared resource, and a timestamp of the update of the analytics. User specified safety parameters include a maximum acceptable number of people using the shared resource and/or a minimum time period during which the shared resource has been unused. The at least one processor is further configured to provide the image of the shared resource to the user. The notification is directed to a facilities service to schedule a cleaning of the shared resource and the user specified safety parameters are workspace safety rules provided by an administrator. The at least one processor is further configured to enable an administrator to identify and label the shared resource and configure a video camera to provide the image of the shared resource. The shared resources include one or more of a cafeteria, a break room, a stockroom, a restroom, a conference room, and a computer equipment room. The at least one processor is further configured to receive proximity data from an Internet of Things device associated with the shared resource, the proximity data identifying a person using the shared resource, the proximity data used to further determine safety related conditions associated with the shared resource.

In at least one example, a method for providing office safety controls. The method includes: performing, by a computer system, computer vision analysis on an image of a shared resource to determine safety related conditions associated with the shared resource, the safety related conditions including a count of people using the shared resource and timing of the use of the shared resource; updating, by the computer system, analytics associated with the shared resource based on the determined safety related conditions; maintaining, by the computer system a notification subscription associated with a user, the notification subscription including user specified safety parameters related to the shared resource; and generating, by the computer system, a notification regarding the shared resource, the generation being based on a comparison of the updated analytics and the user specified safety parameters.

At least some examples of the method can include one or more of the following features. The analytics include one or more of a count of people entering a location associated with the shared resource, a count of people exiting the location associated with the shared resource, a classification of activity of people using the shared resource, and a timestamp of the update of the analytics. User specified safety parameters include a maximum acceptable number of people using the shared resource and/or a minimum time period during which the shared resource has been unused. The act of providing the image of the shared resource to the user. The notification is directed to a facilities service to schedule a cleaning of the shared resource and the user specified safety parameters are workspace safety rules provided by an administrator. The act of enabling an administrator to identify and label the shared resource and configure a video camera to provide the image of the shared resource. The shared resources include one or more of a cafeteria, a break room, a stockroom, a restroom, a conference room, and a computer equipment room. The act of receiving proximity data from an Internet of Things device associated with the shared resource, the proximity data identifying a person using the shared resource, the proximity data used to further determine safety related conditions associated with the shared resource.

In at least one example, a non-transitory computer readable medium storing executable sequences of instructions to provide office safety controls is provided. The sequences of instructions include instructions to: perform computer vision analysis on an image of a shared resource to determine safety related conditions associated with the shared resource, the safety related conditions including a count of people using the shared resource and timing of the use of the shared resource; update analytics associated with the shared resource based on the determined safety related conditions; maintain a notification subscription associated with a user, the notification subscription including user specified safety parameters related to the shared resource; and generate a notification regarding the shared resource, the generation being based on a comparison of the updated analytics and the user specified safety parameters.

At least some examples of the non-transitory computer readable medium can include one or more of the following features. The analytics include one or more of a count of people entering a location associated with the shared resource, a count of people exiting the location associated with the shared resource, a classification of activity of people using the shared resource, and a timestamp of the update of the analytics. User specified safety parameters include a maximum acceptable number of people using the shared resource and/or a minimum time period during which the shared resource has been unused. Instructions further include instructions to provide the image of the shared resource to the user. The notification is directed to a facilities service to schedule a cleaning of the shared resource and the user specified safety parameters are workspace safety rules provided by an administrator. Instructions to enable an administrator to identify and label the shared resource and configure a video camera to provide the image of the shared resource. The shared resources include one or more of a cafeteria, a break room, a stockroom, a restroom, a conference room, and a computer equipment room. Instructions to receive proximity data from an Internet of Things device associated with the shared resource, the proximity data identifying a person using the shared resource, the proximity data used to further determine safety related conditions associated with the shared resource.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

As noted previously, safety concerns arise over the risk of infection from COVID-19 or other infectious threats, as workers return to the office. Workplaces and office environments generally include common areas or shared resources such as cafeterias, coffee rooms, break rooms, printer rooms, and the like. The simultaneous use of these shared resources by workers can increase the risk of virus and/or bacterial transmission. Each employee or individual may have a different level of concern and risk tolerance and may wish to adopt different levels of safety precautions. For example, some workers may be comfortable being around other people for specified periods of time if a certain degree of social distancing can be maintained. Other workers may have a limit on the number of people that they are willing to tolerate in a given space. Still other workers may prefer not to be in any room that is currently occupied or has been occupied within a recent period of time. Employers can implement safety measures such as mask wearing, cleaning procedures, and health assessments, but these approaches, while important, do not address the varied concerns and preferences of individual workers or empower those workers to act in accordance with their own risk tolerance.

To address these and other problems, and as summarized above, various examples described herein are directed to systems and methods for office safety control. In some examples, the disclosed techniques are implemented, at least in part, by an application running in the computer workspace of a user.

In some examples, the disclosed techniques provide video monitoring of shared workspaces and resources coupled with computer vision analysis of the video streams to generate analytics. The analytics may include information such as the number of people using the resource, how the resource is being used, and timing data related to that usage. The placement of video cameras can be configured and managed by an administrator.

In some examples, data may also be provided by Internet of Things (IoT) devices associated with the shared resources. For example, an IoT device located on a cafeteria table can be configured to detect the mobile device of a person that comes within a selected proximity range of the table (e.g., the table and chairs). This proximity data indicates when the person arrives, when the person leaves, and the length of stay. The proximity data can be provided from multiple people and thus provide an indication of how many people are in the region of the shared resource. As another example, an IoT device can be added to a printer to provide information indicating that the printer is being used or not used, and by whom. The placement of the IoT devices and the selected proximity range can be configured and managed by an administrator. Proximity range will vary depending on the particular resource.

The disclosed techniques also provide a capability for users (e.g., workers/employees) to subscribe to a notification service for selected shared resources that are of interest to that user. The user can specify their safety related preferences as part of the subscription process and then receive notifications when the state of the shared resource matches their safety preference. For example, a user may ask to be notified when there is an empty table in the cafeteria, when the printer/copier room has been vacant for at least 5 minutes, or when there are fewer than 3 people in the break room.

In some examples, the safety control system enables a user to select a shared resource or area, configure safety preferences (e.g., send a notification when more than M minutes have elapsed since the last person used the resource or when fewer than N people are gathered in the area of the shared resource), and subscribe to a notification service to generate a notification when the safety preference criteria are met.

In some examples, the safety control system employs computer vision techniques to analyze the video feeds of the shared resources and classify various activities such as the existence of an empty table in a cafeteria or break area, the distance between an empty table and an occupied table, the number of persons in a restroom based on a count of in and out traffic, usage of a coffee machine, printer, or copier, etc.

As yet another example, notifications can be sent to housekeeping services to trigger a request for cleaning after a specified level of usage of the shared resource (e.g., after a certain number of people have occupied a table for a specified length of time, or a certain number of people have used a copier, etc.).

As yet another example, analytics data can be provided to other facility systems such a resource booking. For example, a conference room scheduling system can take advantage of information about the state of monitored conference rooms with regard to infection safety.

Thus, and in accordance with at least some examples disclosed herein, systems and methods for office/workplace safety control are provided. These systems and methods provide for user notification when the state of a shared resource matches the user's safety related preferences.

As will be understood in view of this disclosure, the systems and methods for office safety control provided herein have several advantages over existing methods which attempt to provide broad based protection through rules regarding, for example, mask wearing and disinfection procedures. For instance, the systems and methods described herein are tailored to efficiently meet the needs of each user and can therefore provide an enhanced sense of security and self-empowerment for that user. This is in contrast, for example, to a one-size-fits-all rule on social distancing. The notification system also reduces unnecessary movement of workers (e.g., to personally check on the status/availability of shared resources) which is inefficient and can further contribute to infection transmission.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Office Safety Control System

Figure 1:
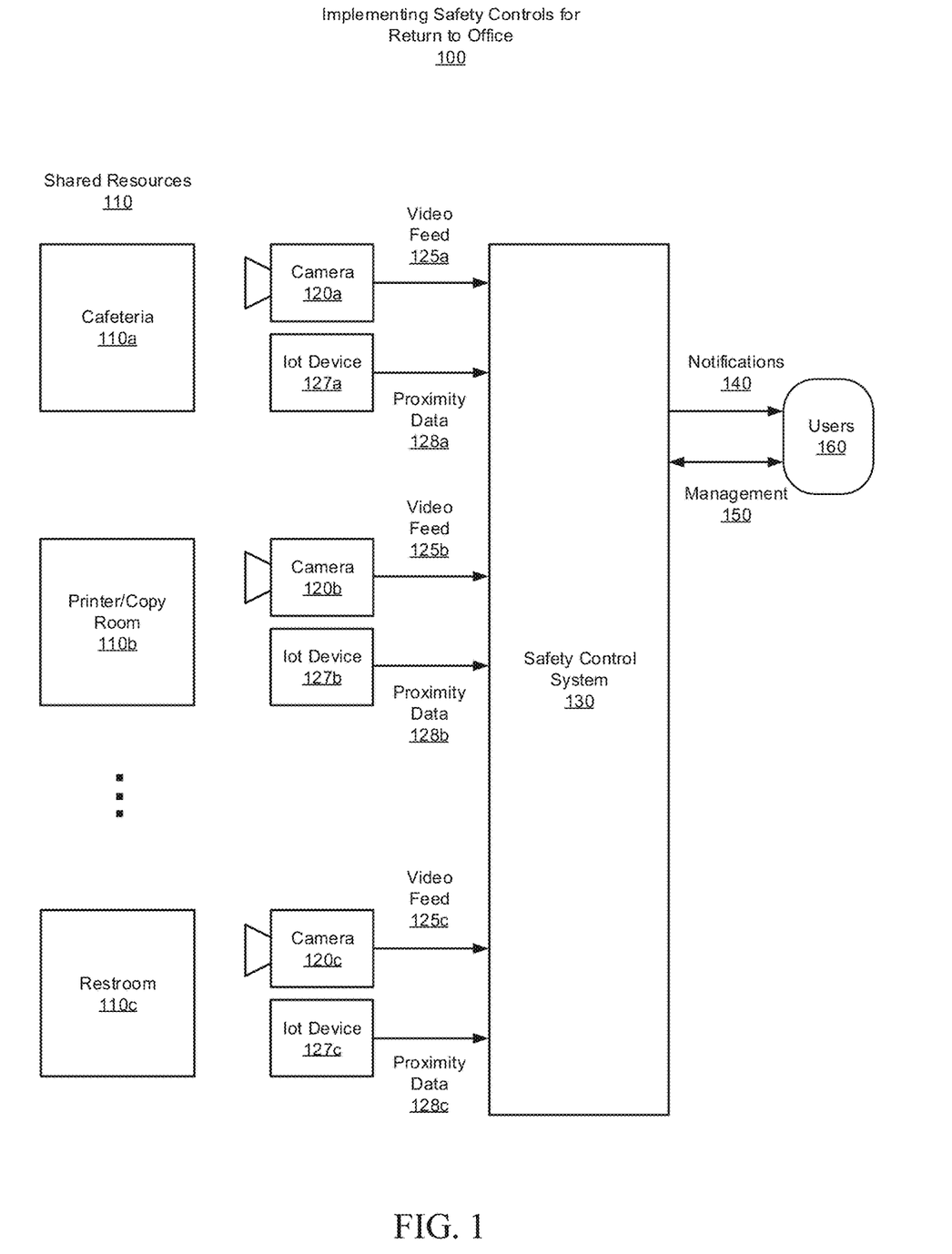
FIG. 1 is a top-level block diagram of an implementation of a system for providing return-to-office safety controls, in accordance with an example of the present disclosure.

FIG. 1 is a top-level block diagram 100 of an implementation of a system 130 for providing return-to-office safety controls, in accordance with an example of the present disclosure. As shown in FIG. 1, the system comprises cameras 120, IoT devices 127, and safety control system 130.

The cameras 120 are configured to monitor the shared resources 110 by providing video feeds 125 to the safety control system 130. Shared resources include any workplace facility that can be used by multiple people. Examples of shared resources include cafeterias, conference rooms, break rooms, stockrooms, restrooms, and computer equipment rooms (e.g., rooms with shared printers, copiers, and the like), to name a few. In some examples, the video feeds may comprise any type of data of interest, including still images (or a series of still images) and audio. In some examples, the data may include infrared images that indicate if someone exhibits an above normal temperature.

The IoT devices 127 are configured to provide proximity data feeds 128 to the safety control system 130. Proximity data, as previously described, provides an indication of the number of people at a shared resource and their distance from that shared resource. IoT devices 127 are configured to detect the mobile devices of people that come within a selected proximity range of the resource. This proximity data thus provides information on the time of arrival and departure of each person as well as the length of stay when they come within a predetermined range of the resource.

In some examples, a resource may be covered by just a camera, just an IoT device, or a combination of a camera and an IoT device.

The safety control system 130 is described in detail below, but at a high level, the system is configured to collect the video feeds 125 and data feeds 128, for storage and analysis, and enable users 160 to manage the system 150 and receive notifications 140 relative to the conditions of shared resources of interest to the users.

Figure 2:
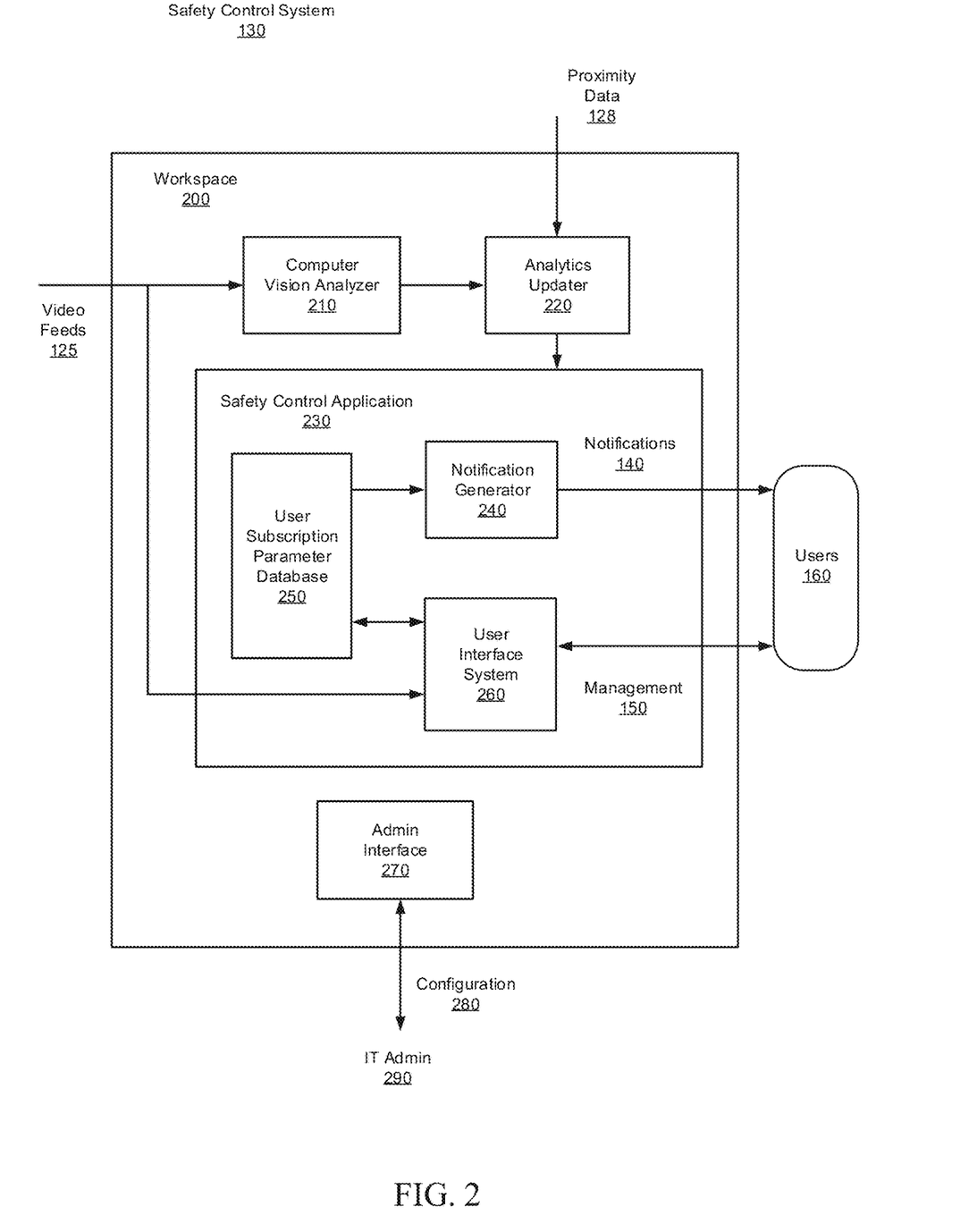
FIG. 2 is a block diagram of the safety control system, in accordance with an example of the present disclosure.

FIG. 2 is a block diagram of the safety control system 130 of FIG. 1, in accordance with an example of the present disclosure. The safety control system 130 is shown to include a computer vision analyzer 210, an analytics updater 220, a safety control application 230, and an administrator interface 270. The safety control application 230 is shown to include a notification generator 240, a user subscription parameter database 250, and a user interface system 260.

The computer vision analyzer 210 is configured to perform computer vision analysis on an image of a shared resource (e.g., provided through video feeds 125 of FIG. 1) to determine safety related conditions associated with the shared resource 110 of FIG. 1. Any suitable computer vision analyzer or machine learning technique may be used, in light of the present disclosure. Some examples include TensorFlow and PyTorch which employ machine learning models based on deep neural networks. Such models can process one or more images or video frames to classify an object such as a person, chair, table, printer, door, etc., or an activity such as a person going inside a door, person leaving, person sitting on a chair etc.

Shared resources may include, for example, a cafeteria, a break room, a stockroom, a restroom, a conference room, a computer equipment room, or any other facility where people may gather for any purpose. In some examples, the safety related conditions include a count of people using the shared resource and timing of the use of the shared resource (e.g., how recently the resource was used). For example, in a cafeteria or break room, a safety-related condition can include a count of unoccupied tables.

The analytics updater 220 is configured to update analytics associated with the shared resource based on the determined safety related conditions as obtained from the computer vision analyzer 210 and/or the proximity data 128 of FIG. 1. In some examples, the analytics include a count of people entering a location associated with the shared resource and a count of people exiting the location associated with the shared resource. For example, in the case of a restroom, where it is not appropriate to have direct visual surveillance, entrance and exit counts can be used to determine whether or not the restroom is occupied.

In some examples, analytics may also include a classification of the activities of people using the shared resource (e.g., whether they are congregating in a tight cluster or standing in line). A timestamp may be associated with the analytics update so that timing analysis can be performed (e.g., to determine how long the resource has been unused).

The administrator interface 270 is configured to enable an administrator 290 to identify and label the shared resources and perform configuration 280 of video cameras 120 and IoT devices 127 of FIG. 1 to provide data feeds from the resources (e.g., video feeds, audio feeds, data feeds, and images of the shared resources). For example, the administrator can set up a camera to monitor the cafeteria and label that video feed as "cafeteria," or "cafeteria 1" if there are multiple cafeterias or cameras.

The safety control application 230 is configured to handle user interaction with the safety control system 130, by providing access to the data feeds and analytics from the shared resources, and managing (e.g., creating, updating, and maintaining) notification subscriptions associated with the user 160 of FIG. 1. The notification subscriptions include user specified safety parameters related to the shared resource. In some examples, the safety parameters include a maximum acceptable number of people using the shared resource and/or a minimum time period during which the shared resource has been unused. For example, user A may not wish to enter the break room if anyone else is present, while user B is willing to enter the break room if there are fewer than 4 people present. As another example, user A may not wish to use a printer until 5 minutes have elapsed since someone else used that printer, while user B may wish to wait 15 minutes.

The user subscription parameter database 250 is configured to store the user specified safety parameters for each user selected shared resource.

The notification generator 240 is configured to generate a notification 140, of FIG. 1, regarding the shared resource. The notification is based on a comparison of the updated analytics and the user specified safety parameters. For example, if the analytics indicate that the restroom is currently empty, and the user specified safety parameters require that condition, then a notification will be generated for that user informing them that the restroom is currently safe for their use.

In some examples, the notification generator 240 is also configured to generate a notification to a facilities service to schedule a cleaning of the shared resource based on a comparison of the updated analytics to workspace safety rules that can be configured by an administrator. For example, after a specified number of people have used a resource for a specified length of time, a cleaning may be scheduled.

The user interface system 260 is configured to allow the users 160 to access the safety control application and perform management functions 150, of FIG. 1, as will be described below in greater detail in connection with FIG. 3.

Figure 3:
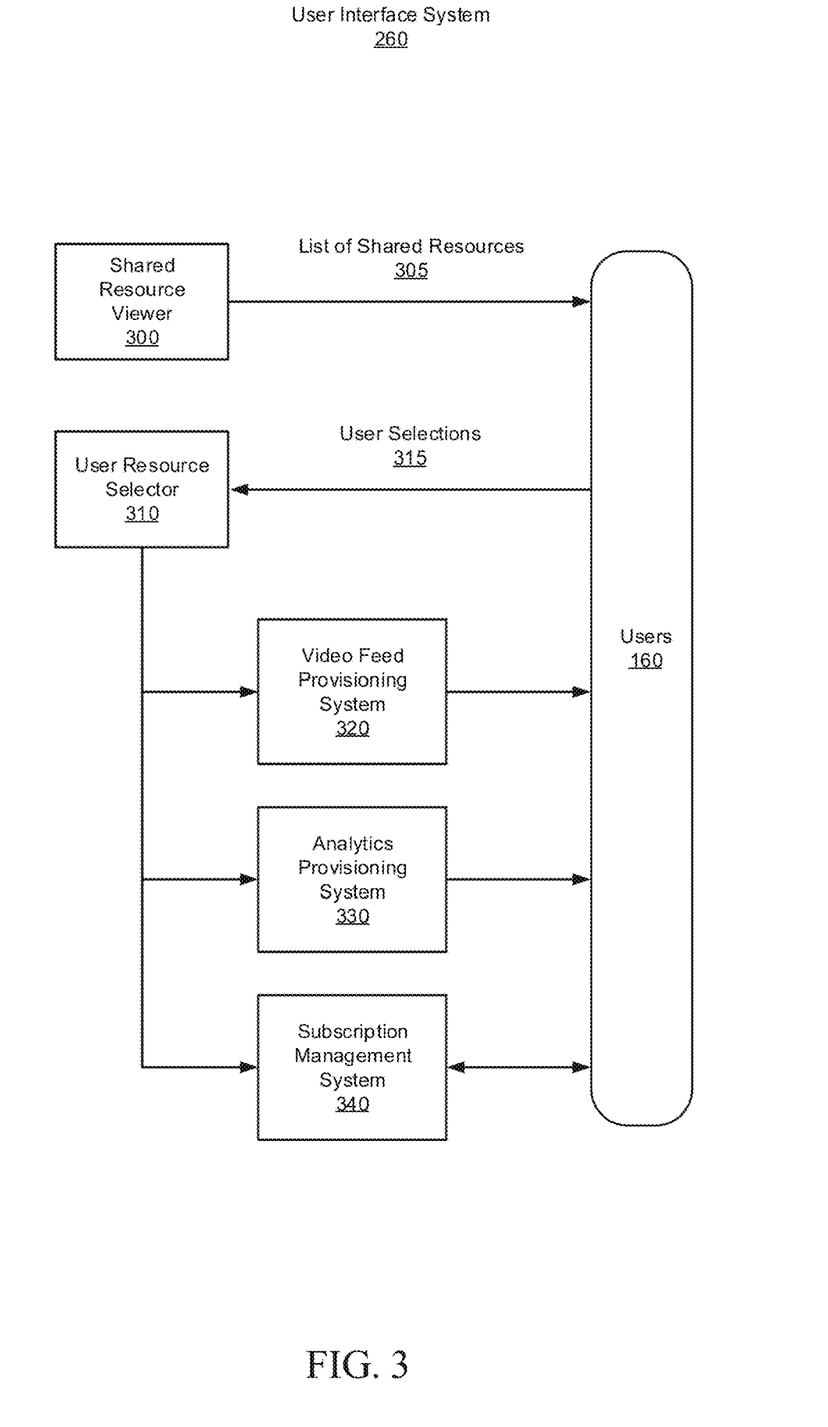
FIG. 3 is a block diagram of a user interface system, in accordance with an example of the present disclosure.

FIG. 3 is a block diagram of the user interface system 260 of FIG. 2, in accordance with an example of the present disclosure. The user interface system 260 is shown to include a shared resource viewer 300, a user resource selector 310, a video feed provisioning system 320, an analytics provisioning system 330, and a subscription management system 340.

The shared resource viewer 300 is configured to provide a list 305 of shared resources 110, of FIG. 1, from which the user can select, for the purpose of viewing and managing notification subscriptions. For example, the list 305 may include the cafeteria, a conference room, a break room, etc. In some examples, the list may be filtered or narrowed down to resources that are at a convenient distance from the user, or otherwise known to be of interest to the user.

The user resource selector 310 is configured to allow the user to select 315 one or more of the shared resources from the provided list 305.

The video feed provisioning system 320 is configured to provide the image or images of the selected shared resource to the user. For example, on occasions, the user may simply wish to view the current state of activity in the cafeteria prior to making any decisions about using the cafeteria. In some examples, audio may also be provided.

The analytics provisioning system 330 is configured to provide the raw analytics data associated with the selected shared resource to the user. For example, the user may simply wish to browse through the available data on any selected resource without necessarily creating a notification subscription.

The subscription management system 340 is configured to enable the user to manage notification subscriptions associated with the selected shared resource. This may include, for example, specifying the user's safety parameters for that resource, enabling or disabling notifications for that resource, and specifying times or dates during which a notification is desired. For example, the user may wish to be notified when the state of the cafeteria matches the user's safety parameters for the cafeteria, but only during the time period from 11 AM to 2 PM.

Office Safety Control Processes

As described above, some examples of the system 130 of FIG. 1 are configured to perform a process for providing return-to-office safety controls. The processes may be executed on a processor of any suitable type (e.g., processor 610 of FIG. 6).

Figure 4:
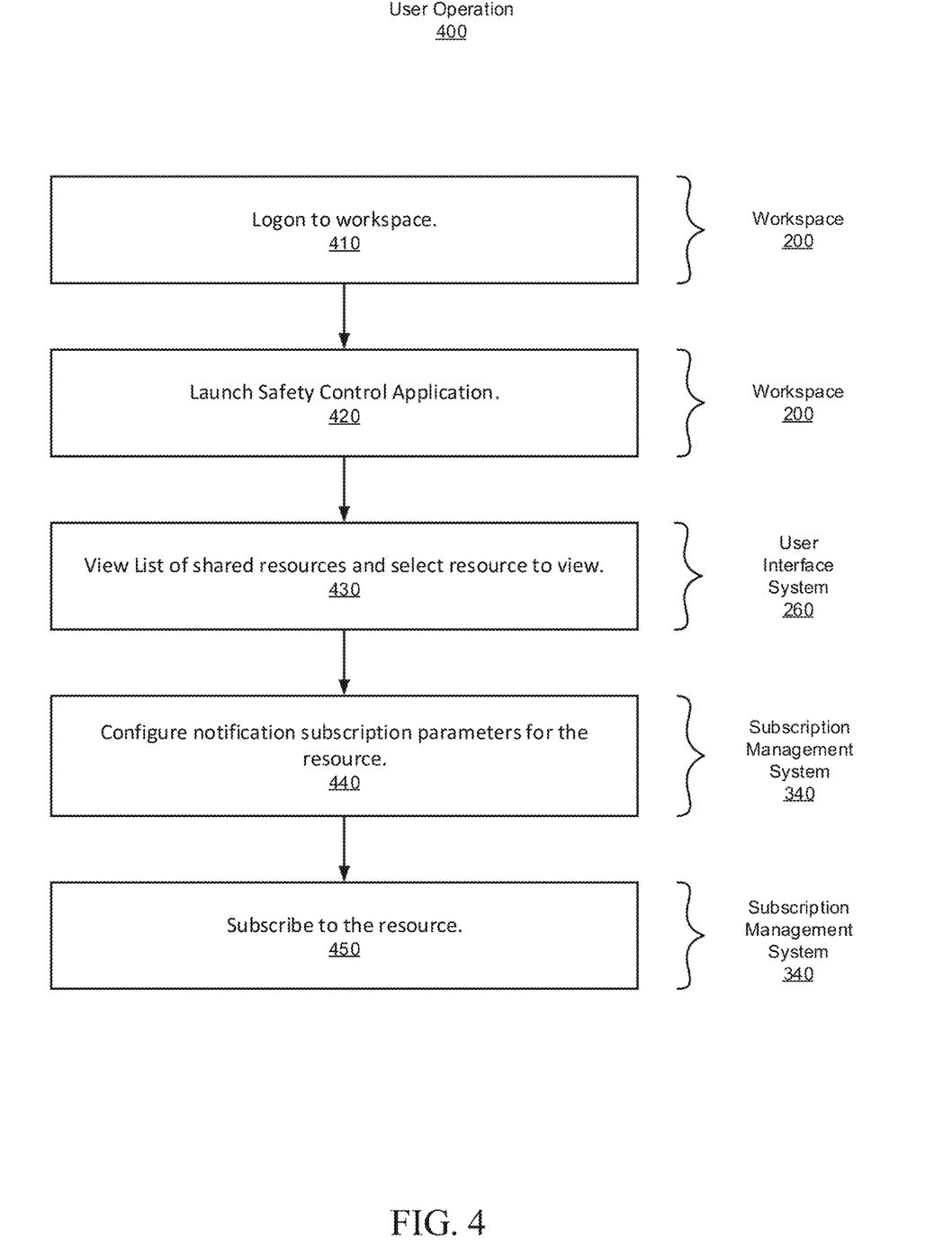
FIG. 4 is a flow diagram of a process for interaction by the safety control system with a user, in accordance with an example of the present disclosure.

FIG. 4 is a flow diagram of a process 400 for interaction by the safety control system with a user, executed by any combination of the system elements/components 120 and 130, of FIG. 1, or the sub-components thereof, in accordance with an example of the present disclosure.

The process 400 starts at operation 410, when the workspace 200, of FIG. 2, grants the user access in response to receipt and authentication of security credentials.

Next, at operation 420, the workspace launches a safety control application, 230 of FIG. 2, in response to a request by the user.

At operation 430, the user interface system 260, of FIG. 2, of the safety control application 230 presents a list of shared resources for examination by the user. The list of shared resources may include, for example, a cafeteria, a printer room, or a restroom. The user interface system allows the user to select one or more of the resources to view in more detail. Details may include a video feed, an audio feed, and/or still images of the resource that provide relatively current or real-time information about the resource. Details may also include the analytic results that are generated from the computer vision analysis process.

At operation 440, the subscription management system 340, of FIG. 3, allows the user to configure notification subscription parameters for the selected resource. For example, the user can specify that a notification is desired if the number of people using the resource drops below a threshold value or if the resource has been unused for more than a specified length of time.

At operation 450, the subscription management system 340, of FIG. 3, enables the user to subscribe to the selected resource so that notifications will be provided to that user based on the specified parameters for that user.

Figure 5:
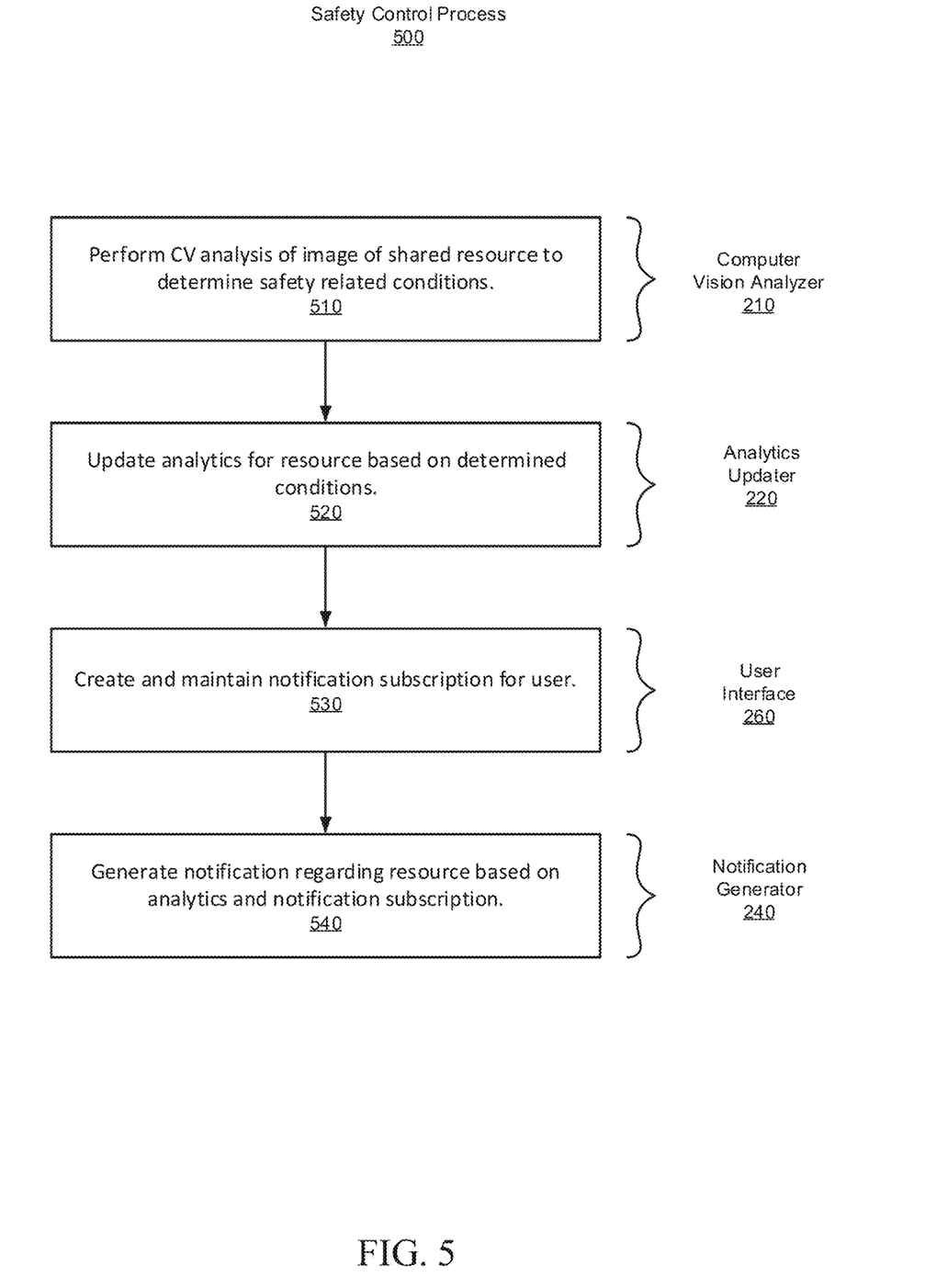
FIG. 5 is a flow diagram of the safety control process, in accordance with an example of the present disclosure.

FIG. 5 is a flow diagram of the safety control process, executed by any combination of the system elements/components 120 and 130, of FIG. 1, or the sub-components thereof in accordance with an example of the present disclosure.

The process 500 starts at operation 510, when the computer vision analyzer 210, of FIG. 2, performs computer vision analysis of an image of a shared resource to determine the status of safety related conditions. Status of safety related conditions may also be determined from the proximity data feeds 128 provided by IoT devices 127 of FIG. 1. The safety related conditions may include a count of people using the shared resource, timing of the use of the shared resource (e.g., how long since a person has last used the resource), and how close a person is or was to the shared resource.

Next, at operation 520, the analytics updater 220, of FIG. 2, updates analytics for the resources based on the determined conditions. The analytics may include one or more of a count of people entering a location associated with the shared resource, a count of people exiting the location associated with the shared resource, a classification of activity of people using the shared resource, and a timestamp associated with the analytics update.

At operation 530, the user interface system 260, of FIG. 2, creates and maintains notification subscriptions for users of the system. The notification subscription includes user specified safety parameters related to the shared resource. For example, the user may consider a particular resource, such as a break room, to be safe if the number of people using that resource is less than a specified number.

At operation 540, the notification generator 240, of FIG. 2, generates notifications regarding the shared resources based on a comparison of the updated analytics and the user specified safety parameters of the notification subscriptions.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Office Safety Control

Figure 6:
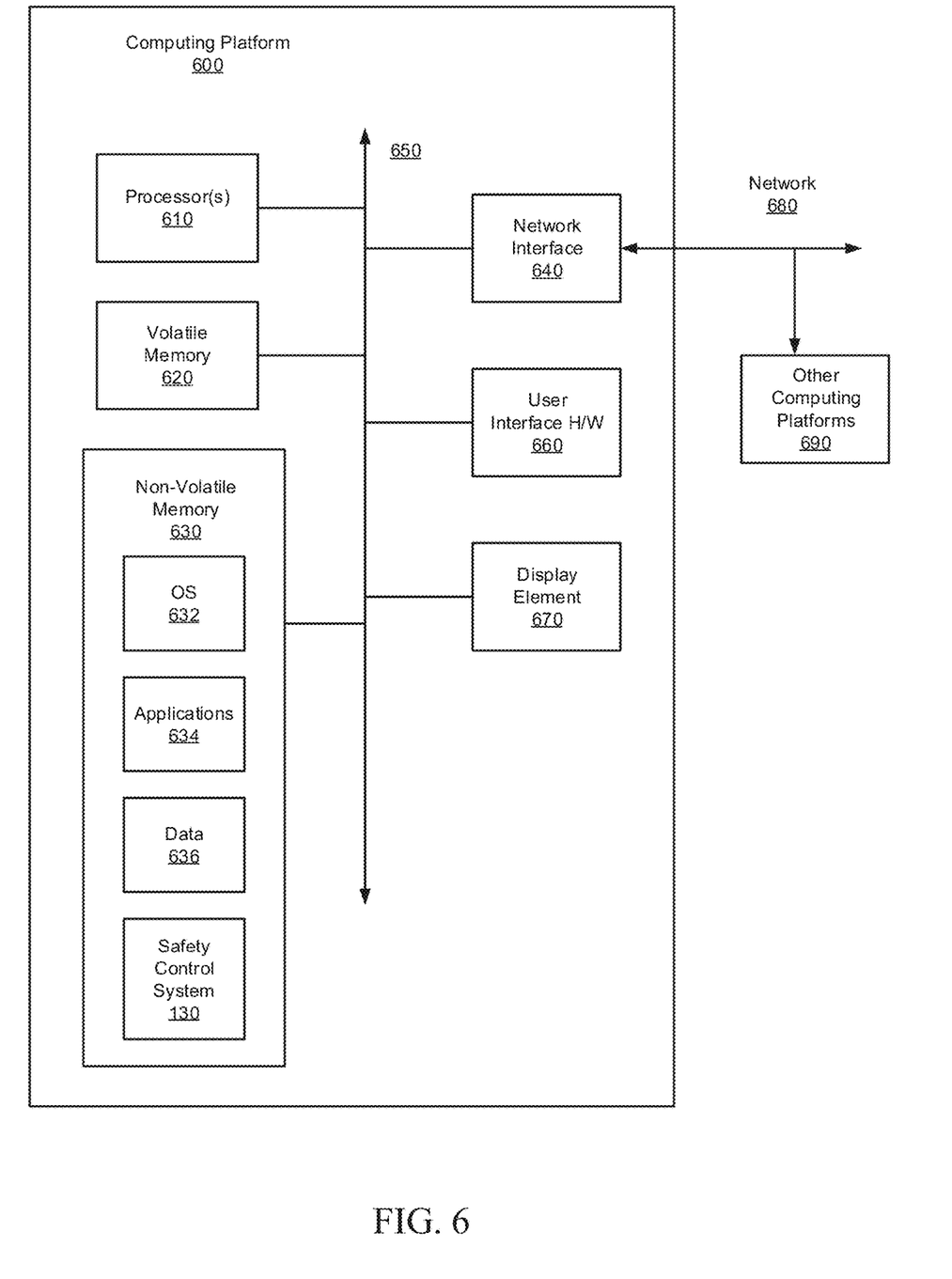
FIG. 6 is a block diagram of a computing platform configured to perform a process for providing return-to-office safety controls, in accordance with an example of the present disclosure.

FIG. 6 is a block diagram of a computing platform 600 configured to perform a process for providing return-to-office safety controls, in accordance with an example of the present disclosure. In some cases, the platform 600 may be a workstation, server, laptop, mobile device, or smartphone.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, a microphone, one or more speakers, one or more biometric scanners, one or more environmental sensors, and one or more accelerometers, etc.).

The display element 670, can provide a graphical user interface (GUI) and in some cases, may be a touchscreen or any other suitable display device.

The non-volatile memory 630 stores an operating system 632, one or more applications 634, data 636, and elements of the safety control system 130 of FIG. 1, such that, for example, computer instructions of the operating system 632, the applications 634, and the elements of the safety control system 130, are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
    a memory; and
    at least one processor coupled to the memory and configured to:
        perform computer vision analysis on an image of a shared resource to determine safety related conditions associated with the shared resource, the safety related conditions including a count of people using the shared resource and timing of the use of the shared resource;
        update analytics associated with the shared resource based on the determined safety related conditions;
        maintain a notification subscription associated with a user, the notification subscription including user specified safety parameters related to the shared resource, the maintaining including enabling or disabling notifications associated with the shared resource; and
        generate a notification regarding the shared resource, the generation being based on a comparison of the updated analytics and the user specified safety parameters.

2. The computer system of claim 1, wherein the analytics include one or more of a count of people entering a location associated with the shared resource, a count of people exiting the location associated with the shared resource, a classification of activity of people using the shared resource, and a timestamp of the update of the analytics.

3. The computer system of claim 1, wherein user specified safety parameters include a maximum acceptable number of people using the shared resource and/or a minimum time period during which the shared resource has been unused.

4. The computer system of claim 1, wherein the at least one processor is further configured to provide the image of the shared resource to the user.

5. The computer system of claim 1, wherein the notification is directed to a facilities service to schedule a cleaning of the shared resource and the user specified safety parameters are workspace safety rules provided by an administrator.

6. The computer system of claim 1, wherein the at least one processor is further configured to enable an administrator to identify and label the shared resource and configure a video camera to provide the image of the shared resource.

7. The computer system of claim 1, wherein the shared resources include one or more of a cafeteria, a break room, a stockroom, a restroom, a conference room, and a computer equipment room.

8. The computer system of claim 1, wherein the at least one processor is further configured to receive proximity data from an Internet of Things device associated with the shared resource, the proximity data identifying a person using the shared resource, the proximity data used to further determine safety related conditions associated with the shared resource.

9. A method for providing office safety controls comprising:
    performing, by a computer system, computer vision analysis on an image of a shared resource to determine safety related conditions associated with the shared resource, the safety related conditions including a count of people using the shared resource and timing of the use of the shared resource;
    updating, by the computer system, analytics associated with the shared resource based on the determined safety related conditions;
    maintaining, by the computer system a notification subscription associated with a user, the notification subscription including user specified safety parameters related to the shared resource, the maintaining including enabling or disabling notifications associated with the shared resource; and
    generating, by the computer system, a notification regarding the shared resource, the generation being based on a comparison of the updated analytics and the user specified safety parameters.

10. The method of claim 9, wherein the analytics include one or more of a count of people entering a location associated with the shared resource, a count of people exiting the location associated with the shared resource, a classification of activity of people using the shared resource, and a timestamp of the update of the analytics.

11. The method of claim 9, wherein user specified safety parameters include a maximum acceptable number of people using the shared resource and/or a minimum time period during which the shared resource has been unused.

12. The method of claim 9, further comprising providing the image of the shared resource to the user.

13. The method of claim 9, wherein the notification is directed to a facilities service to schedule a cleaning of the shared resource and the user specified safety parameters are workspace safety rules provided by an administrator.

14. The method of claim 9, further comprising enabling an administrator to identify and label the shared resource and configure a video camera to provide the image of the shared resource.

15. The method of claim 9, wherein the shared resources include one or more of a cafeteria, a break room, a stockroom, a restroom, a conference room, and a computer equipment room.

16. The method of claim 9, further comprising receiving proximity data from an Internet of Things device associated with the shared resource, the proximity data identifying a person using the shared resource, the proximity data used to further determine safety related conditions associated with the shared resource.

17. A non-transitory computer readable medium storing executable sequences of instructions to provide office safety controls, the sequences of instructions comprising instructions to:

perform computer vision analysis on an image of a shared resource to determine safety related conditions associated with the shared resource, the safety related conditions including a count of people using the shared resource and timing of the use of the shared resource;
update analytics associated with the shared resource based on the determined safety related conditions;
maintain a notification subscription associated with a user, the notification subscription including user specified safety parameters related to the shared resource, the maintaining including enabling or disabling notifications associated with the shared resource; and
generate a notification regarding the shared resource, the generation being based on a comparison of the updated analytics and the user specified safety parameters.

18. The computer readable medium of claim 17, wherein the analytics include one or more of a count of people entering a location associated with the shared resource, a count of people exiting the location associated with the shared resource, a classification of activity of people using the shared resource, and a timestamp of the update of the analytics.

19. The computer readable medium of claim 17, wherein user specified safety parameters include a maximum acceptable number of people using the shared resource and/or a minimum time period during which the shared resource has been unused.

20. The computer readable medium of claim 17, wherein the sequences of instructions further include instructions to provide the image of the shared resource to the user.

21. The computer readable medium of claim 17, wherein the notification is directed to a facilities service to schedule a cleaning of the shared resource and the user specified safety parameters are workspace safety rules provided by an administrator.

22. The computer readable medium of claim 17, wherein the sequences of instructions further include instructions to enable an administrator to identify and label the shared resource and configure a video camera to provide the image of the shared resource.

23. The computer readable medium of claim 17, wherein the shared resources include one or more of a cafeteria, a break room, a stockroom, a restroom, a conference room, and a computer equipment room.

24. The computer readable medium of claim 17, wherein the sequences of instructions further include instructions to receive proximity data from an Internet of Things device associated with the shared resource, the proximity data identifying a person using the shared resource, the proximity data used to further determine safety related conditions associated with the shared resource.

* * * * *